United States Patent [19]

Armor et al.

[11] 4,208,599

[45] Jun. 17, 1980

[54] INTEGRAL COMPOSITE NOZZLE-SHIELD ASSEMBLY FOR A GAS-COOLED DYNAMOELECTRIC MACHINE

[75] Inventors: Anthony F. Armor, Schenectady; William L. Darby, Scotia; James B. Archibald, Schenectady; Frank R. Landrio, Delanson, all of N.Y.

[73] Assignee: General Electric Company, Schenectady, N.Y.

[21] Appl. No.: 913,486

[22] Filed: Jun. 7, 1978

[51] Int. Cl.² .............................................. H02K 5/18
[52] U.S. Cl. ........................................ 310/64; 310/53
[58] Field of Search ...................... 310/64, 55, 58, 61, 310/59, 57, 65, 53, 162, 63, 52

[56] References Cited

U.S. PATENT DOCUMENTS

| | | | |
|---|---|---|---|
| 2,920,218 | 1/1960 | Beckwith | 310/64 |
| 3,110,827 | 11/1963 | Baudry | 310/55 |
| 3,271,600 | 9/1966 | Philofsky | 310/55 |
| 3,497,737 | 2/1970 | Philofsky | 310/58 |
| 3,739,208 | 6/1973 | Sharthand | 310/58 |
| 3,818,256 | 6/1974 | Ying | 310/64 |
| 4,039,872 | 8/1977 | Armor | 310/62 |
| 4,071,791 | 1/1978 | Armor | 310/59 |

*Primary Examiner*—R. Skudy
*Attorney, Agent, or Firm*—Ormand R. Austin; John F. Ahern

[57] ABSTRACT

An integral nozzle-shield assembly for a gas-cooled dynamoelectric machine such as a large turbine-driven generator is described. The nozzle-shield assembly is formed of a non-conductive, non-magnetic material such as molded fiberglass and resin and serves to channel hydrogen gas between a heat exchanger and a rotor-mounted fan used to pump the gas through coolant passages in the dynamoelectric machine, and the assembly also provides a labyrinth seal over the fan blade tips. In one embodiment, the nozzle-shield assembly includes two 180-degree halves whose thickness varies circumferentially and which may be installed in a generator by bolting their outer edges to a stator frame member of the generator and bolting the halves together at the two radial joints between halves using flat metal plate connectors. Use of a material such as fiberglass and resin to form an integral nozzle-shield assembly results in a structure which is not susceptible to eddy current losses or damage due to arcing, and this integral assembly is readily fabricated and easy to install in a dynamoelectric machine.

6 Claims, 8 Drawing Figures

INTEGRAL COMPOSITE NOZZLE-SHIELD ASSEMBLY FOR A GAS-COOLED DYNAMOELECTRIC MACHINE

BACKGROUND OF THE INVENTION

This invention relates to a gas-cooled dynamoelectric machine and in particular to an integral composite nozzle-shield assembly used in directing the flow of cooling gas within a large turbine-driven generator.

Dynamoelectric machines such as large turbine-driven generators utilize a gas such as hydrogen for cooling the stator core and portions of a rotor mounted within a central bore of the stator core. The cooling gas is circulated by a fan attached to the rotor and by pumping action of the rotor itself and is directed through passages in the rotor and stator core and recirculated through gas coolers usually located in the upper portion of the machine. The general direction of coolant flow may be in the "reverse" sense, as disclosed in U.S. Pat. No. 3,739,208 to Shartrand and U.S. Pat. No. 4,039,872 to Armor et al, both assigned to the assignee of the present invention, wherein gas is drawn into the fan from the end of the gas gap between rotor and stator core, pumped upward to a gas cooler, then split into a first stream which is directed through generally radial stator core inlet cooling passages and into the gas gap for pickup and discharge at the rotor surface and a second stream which is directed from the cooler to passages in the rotor end portion. The gas is then returned to the fan from the rotor end portion cooling passages and from generally radial stator core outlet cooling passages. Alternatively, the gas coolant may circulate in the "forward" direction from the fan through stator core inlet cooling passages to the gas gap for pickup at the rotor surface and also from the fan to passages in the rotor end portions, and then back to the gas gap and radially outward through stator core outlet cooling passages and to the gas cooler.

In either case, in order to provide a smooth passage for flow between the fan and gas cooler and to permit the fan to develop pressures adequate to pump gas through the cooler and coolant passages, a nozzle ring is mounted over the fan blade tips in sealing relationship with the fan blades. The nozzle ring is typically bolted to an annular shield which extends radially outward from the nozzle ring and in turn is bolted to a frame member of the stator, and this combination, together with the end portion of the generator casing, channels the gas coolant between the cooler and fan. In many dynamoelectric machines both nozzle ring and shield are formed of metallic components such as steel; however, in the above-mentioned U.S. Pat. No. 4,039,872 to Armor et al the deleterious effect on performance of a generator of eddy currents induced in magnetically susceptible metallic nozzle guide vanes and their mounting assembly by stray flux from the rotor and the end turns of the stator winding bars was recognized, and accordingly the guide vanes and nozzle rings described in U.S. Pat. No. 4,039,872 were formed of electrically non-conductive non-magnetic material such as fiberglass. While this limited use of fiberglass is effective to eliminate eddy-current heating in the nozzle ring and guide vanes of a generator and thus provides a significant performance benefit, the retention of a separate metallic shield (e.g., member 43 in FIG. 1 of U.S. Pat. No. 4,039,872) to which the nozzle ring is attached entails certain drawbacks. For example, since the shield is located near the source of stray flux, it too, if metallic, is susceptible to eddy-current heating which penalizes efficiency of the dynamoelectric machine. Moreover, the proximity of the shield to the end turns of the stator winding bars presents some risk of electrical flashover or arcing which could under certain circumstances occur between a metallic shield and the stator end turns if bar insulation failed; the likelihood of a flashover, though remote, rises somewhat as machine power ratings tend to increase and hence result in higher stator winding currents and voltages during operation. Finally, the use of a separate metallic shield results in a heavy member whose manufacture and field assembly to a non-metallic nozzle ring is complex and costly.

Accordingly, it is an object of the present invention to provide an integral nozzle-shield assembly for a dynamoelectric machine which is not subject to eddy-current heating or electrical flashover.

It is another object of the invention to provide a nozzle-shield assembly for a dynamoelectric machine which includes at least two arcuate sections and which has substantially uniform stiffness circumferentially.

A further object of the invention is to provide a nozzle-shield assembly for a dynamoelectric machine which is lightweight and easy to fabricate and install.

SUMMARY OF THE INVENTION

These and other objects are attained by providing an integral composite nozzle-shield assembly for a dynamoelectric machine. The nozzle-shield assembly, which is used to guide the flow of a gas coolant between a gas cooler and a fan mounted on the rotor of the dynamoelectric machine, comprises a plurality of arcuate sections of non-electrically conductive, non-magnetic material such as fiberglass and resin, means for connecting the outer edge portion of the arcuate sections to a frame member of the stator of the dynamoelectric machine, means for connecting the arcuate sections together, and a serrated rub strip mounted in an annular recess of the inner edge portion of the arcuate sections for forming a labyrinth seal with the tips of the fan blades. In a preferred embodiment of the invention, the nozzle-shield assembly includes two 180-degree sections of molded fiberglass and resin which are bolted together along radial joints using flat metal plates, and a rub strip of trapezoidal cross section whose positive retention within the arcuate sections is assured by molding the arcuate sections around the rub strip. The thickness of the arcuate sections may be tapered circumferentially from a maximum near the location of a radial joint to a minimum at an angular location 60–90 degrees away from the joint to give the nozzle-shield assembly uniform stiffness circumferentially. The integral construction using composite non-conductive, non-magnetic materials provides a simple lightweight structure able to resist pressure and vibration forces and not susceptible to flux-induced eddy-current heating or the risk of damage due to electrical flashover between end turns of the stator winding and the nozzle-shield assembly.

BRIEF DESCRIPTION OF THE DRAWINGS

While the specification concludes with claims particularly pointing out and distinctly claiming that which is regarded as the invention, a more complete understanding of the invention may be gained from the following description taken in connection with the accompanying drawings in which:

DETAILED DESCRIPTION OF THE INVENTION

Figure 1:
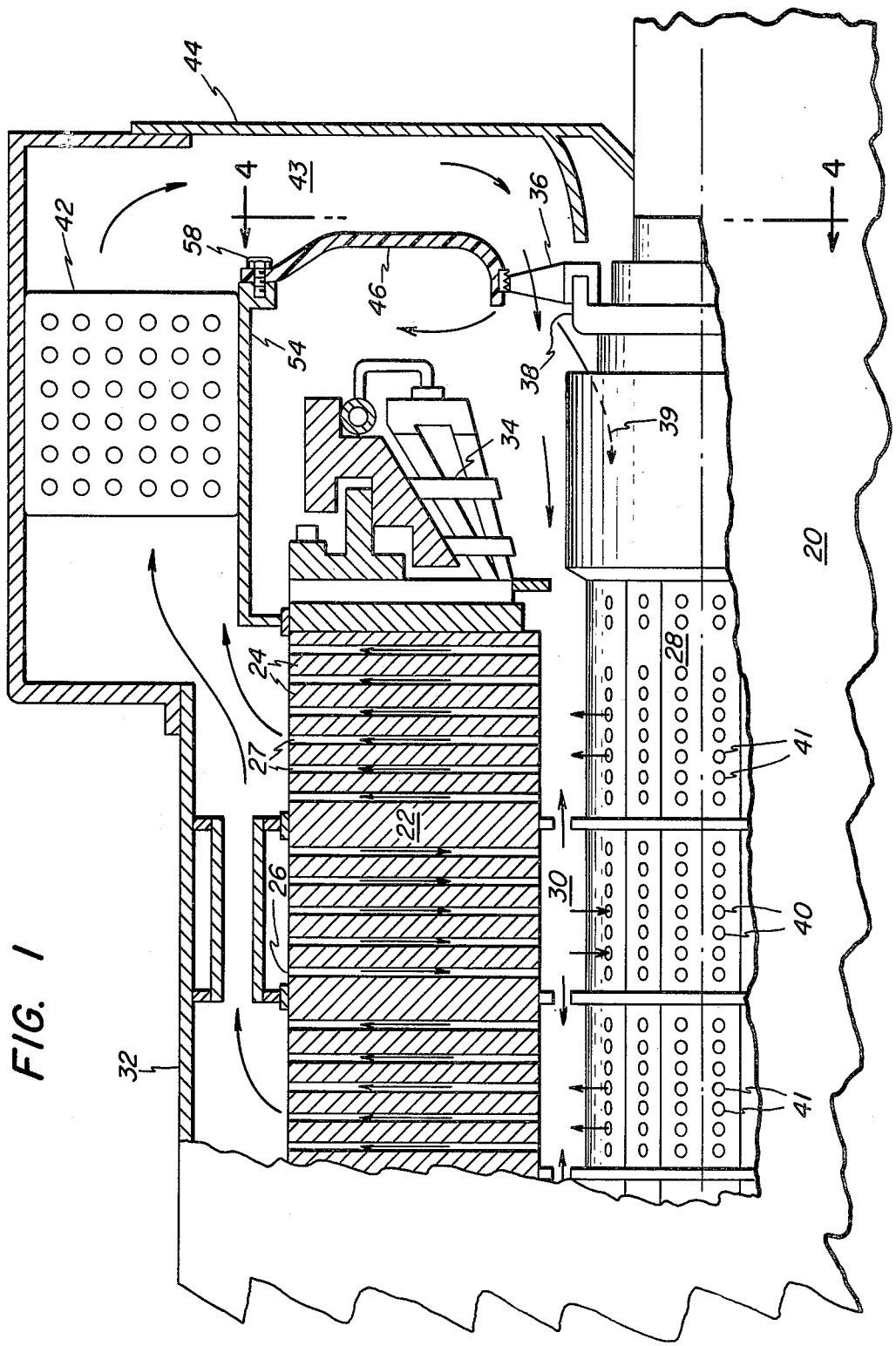
FIG. 1 is a side elevation view of one end of a dynamoelectric machine with a section broken away to expose internal details and showing a preferred embodiment of the nozzle-shield assembly of the invention.

FIG. 1 shows an end portion of a dynamoelectric machine 20 which for the purpose of simply illustrating a preferred embodiment of the invention is shown as a forward-flow-cooled machine with a single-stage fan, it being appreciated that the nozzle-shield assembly of the invention is useful also with reverse-flow-cooled machines such as are described in the aforementioned U.S. Pat. No. 4,039,872 to Armor et al and with multistage fans and fans with stator-mounted guide vanes. Dynamoelectric machine 20, whose opposite end is substantially identical to that shown in FIG. 1, includes a stator having a core 22 comprised of groups of laminations 24 separated by generally radial inlet cooling ducts 26 and outlet cooling ducts 27, a rotor 28 disposed within stator core 22 and defining herewith a gas gap 30, and a gas-tight outer casing 32. Laminations 24 of stator core 22 are each formed with slots (not shown) for carrying stator winding bars and these bars include reversing portions or end turns 34 at each end of stator core 22. The winding bars are generally cooled in part by a liquid which circulates through these bars.

For more general cooling of stator core 22 and rotor 28, a gas coolant such as hydrogen is circulated through dynamoelectric machine 20 by means of a fan 36 including fan blades 37 (FIG. 4) mounted on support ring 38 which is attached to rotor 28. As shown by the arrows in FIG. 1, during operation of dynamoelectric machine 20 gas coolant is pumped by fan 36 into passages in the rotor end portion as suggested by dashed arrow 39, and also through stator inlet ducts 26 into gas gap 30. The gas coolant is then picked up by scoop-like holes 40 in the surface of rotor 28, discharged back to gas gap 30 through rotor outlet holes 41, and fed radially outward through stator outlet ducts 27. The gas then passes through a heat exhanger such as gas cooler 42 and is returned to fan 36 through a channel 43 formed by the end portion 44 of generator casing 32 and a nozzle-shield assembly 46.

Figure 2:
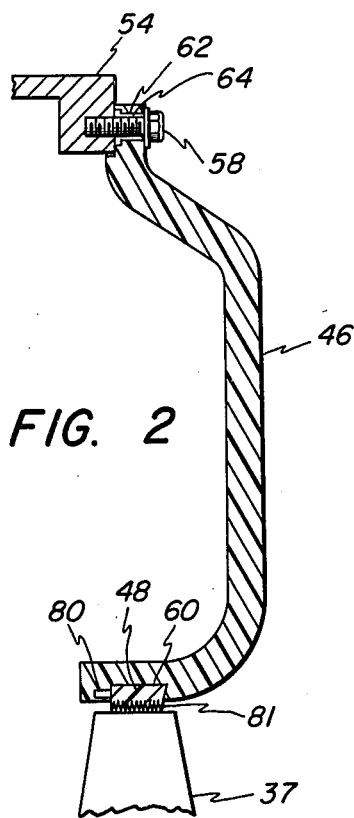
FIG. 2 is an enlarged view of a portion of FIG. 1 showing the nozzle-shield assembly.

Nozzle-shield assembly 46 provides a smoothly contoured passage to minimize pressure losses associated with the flow of gas coolant from cooler 42 to fan 36 and also as shown in FIG. 2, shrouds blades 37 of fan 36, providing, by means of rub strip 48 mounted in assembly 46 adjacent to the tip of blades 37, a labyrinth seal preventing excess leakage of gas coolant over the blade tips.

Figure 3:
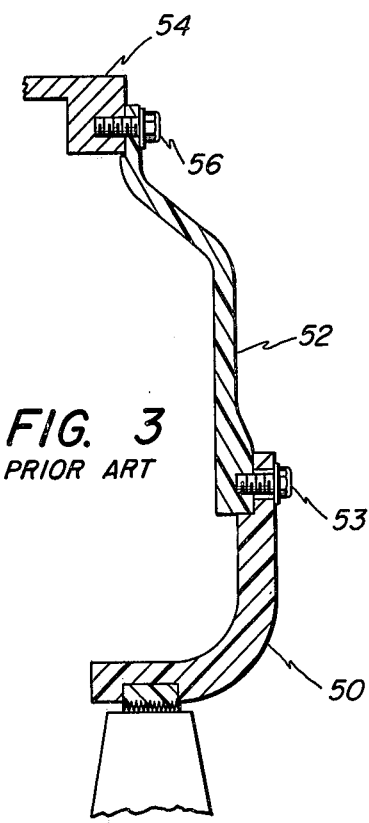
FIG. 3 is a view similar to FIG. 2 but of a prior art nozzle and shield combination.

A side elevation view of a prior art nozzle and shield combination formerly used in place of integral nozzle-shield assembly 46 is given in FIG. 3 wherein nozzle 50 and shield 52 comprise separate, generally annular members connected together near the outer radius of nozzle 50 by a circumferential array of bolts, one of which is shown at 53. Shield 52 in turn is shown as fastened to a stator frame member 54 by means of bolts such as bolt 56. In certain preferred prior art nozzle and shield arrangements, nozzle 50 is formed of a non-conductive, non-magnetic material such as fiberglass to preclude the generation of eddy currents therein from stray flux from nearby portions of the rotor and the stator end turns of the dynamoelectric machine in which it is mounted. Shield 52, on the other hand, is fabricated from a metal such as steel. Thus shield 52, in addition to being heavy and necessitating separate alignment with and attachment to nozzle 50 during assembly, remains susceptible to eddy-current heating during operation. Also, as power ratings of dynamoelectric machines have increased and the operating currents and voltages in stator winding bars have attained very high levels, the proximity of a metallic shield 52 to stator end turns results in an identifiable risk of electrical strike or flashover between stator end turns and shield 52.

Figure 4:
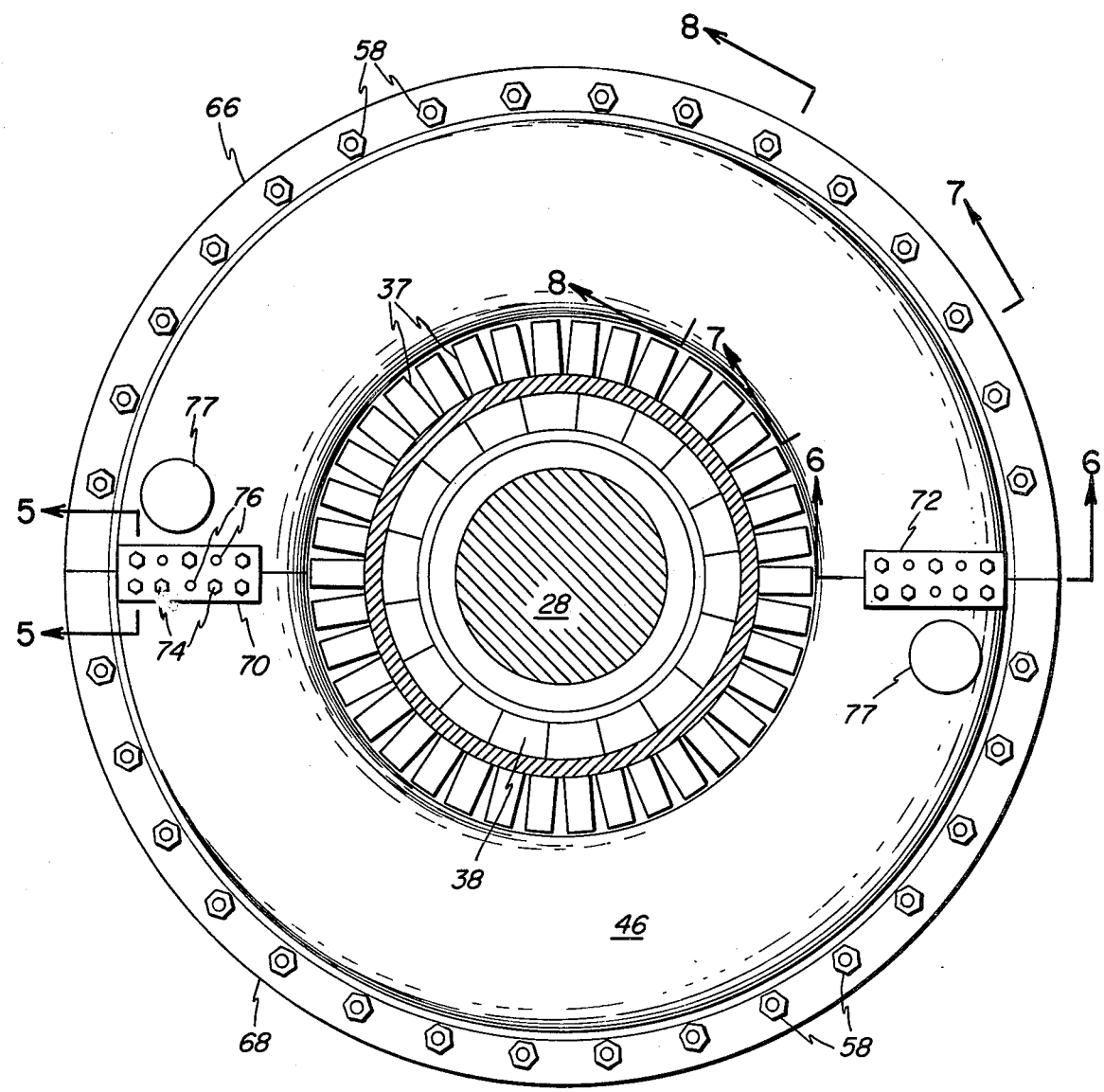
FIG. 4 is an end view of the dynamoelectric machine of FIG. 1 illustrating a preferred embodiment of the invention wherein the nozzle-shield assembly includes two 180-degree arcuate sections joined by flat plate connectors.

To avoid these disadvantages of the prior art nozzle and shield combination, the improved nozzle-shield assembly 46 of the invention shown in FIGS. 1, 2 and 4–8 comprises an integral annular assembly formed essentially entirely of a non-conductive, non-magnetic material such as fiberglass plus a resin. As indicated in FIGS. 1, 2 and 4, nozzle-shield assembly 46 is attached to frame member 54 of the stator of dynamoelectric machine 20 by means of bolts 58 spaced around the circumference of nozzle-shield assembly 46 near its outer edge, and includes a ring-shaped rub strip 48 mounted in a recess 60 in the inner edge portion of assembly 46 and in sealing relationship with fan blades 37. To ensure that the attachment of non-metallic nozzle-shield assembly 46 to metallic frame member 54 remains tight and secure over the long operating life of dynamoelectric machine 20, bolts 58 bear against metallic bushings such as steel bushing 62 which is cemented in bushing hole 64 of assembly 46 (FIG. 2) prior to the attachment of nozzle-shield assembly 46 to frame member 54.

In the preferred embodiment of nozzle-shield assembly 46 illustrated in FIG. 4, and to facilitate its installation in dynamoelectric machine 20, nozzle-shield assembly 46 is fabricated as two halves or 180-degree arcuate sections 66 and 68 which are subsequently connected together during installation by two flat metal plates 70 and 72 and a plurality of bolts 74. Dowels 76 may also be inserted into appropriate holes in flat plates 70 and 72 and arcuate sections 66 and 68 to facilitate alignment of sections 66 and 68 during installation. An access port normally covered by a cover plate 77 may be provided in each arcuate section to permit inspection of portions of dynamoelectric machine 20 inboard of nozzle-shield assembly 46.

Figure 5:
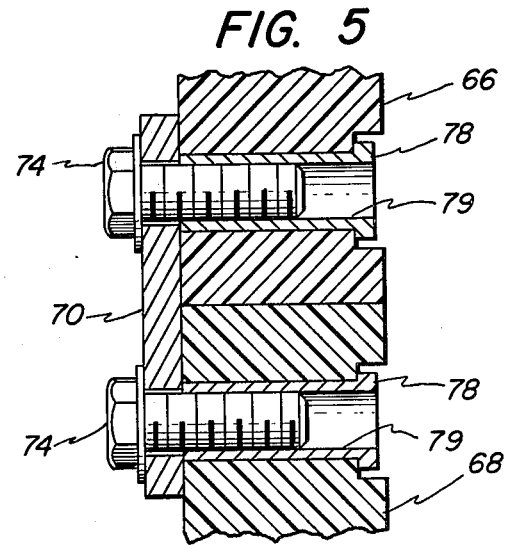
FIG. 5 is a view taken along line 5—5 of FIG. 4.

FIG. 5 shows a cross section of nozzle-shield assembly 46 near one of the radial joints between arcuate sections 66 and 68 and illustrates details of the connection of these sections by flat plate 70 and bolts 74, including metallic bushings 78 which are provided in bushing holes 79 to avoid loss of torque on bolts 74 as a result of creep of the non-metallic material of sections 66 and 68.

Since nozzle-shield assembly 46 (see FIG. 2) is normally installed with a portion of rub strip 48 included in each of the two or more arcuate sections, rub strip 48 also comprises a plurality of segments (e.g., four 90-degree segments). Although these strip segments may be cemented or bolted into a recess 60 machined in arcuate sections 66 and 68 after fabrication of sections 66 and 68, in a preferred embodiment of the invention the rub strip segments, which are typically of a rigid non-metallic material such as Textolite® material formed from a filler and binder and available commercially from General Electric Company, Fairfield, Connecticut, are pre-placed on a mold used in fabrication of arcuate sections 66 and 68, and these sections are molded around them. A taper on one side of rub strip 48, as shown in FIG. 2 wherein the trapezoidal cross-sectional shape of rub strip 48 is apparent, provides a positive keyed fit or locking of this side of rub strip 48 within the arcuate sections after molding thereof is complete, and glass dowels such as dowel 80 inserted into the opposite side of rub strip 48 either prior or subsequent to molding of arcuate sections 66 and 68 provide additional locking of rub strip 48 into these sections. Machining of serrations 81 into the surface of rub strip 48 to provide a labyrinth seal upon installation of the nozzle-shield assembly is typically performed subsequent to fabrication of sections 66 and 68.

Figure 6:
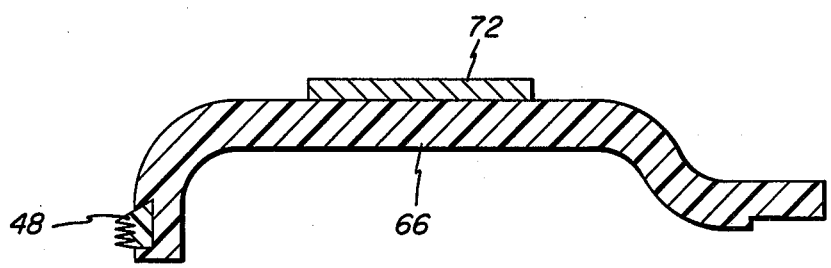
FIGS. 6, 7 and 8 are views taken respectively along lines 6—6, 7—7, and 8—8 of FIG. 4 and illustrate the decrease in thickness of a preferred embodiment of the nozzle-shield assembly at angular locations away from the flat plate connectors.
Figure 7:
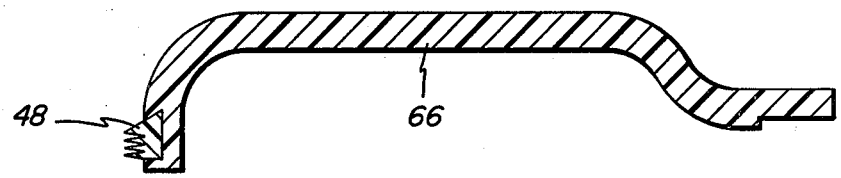
Figure 8:
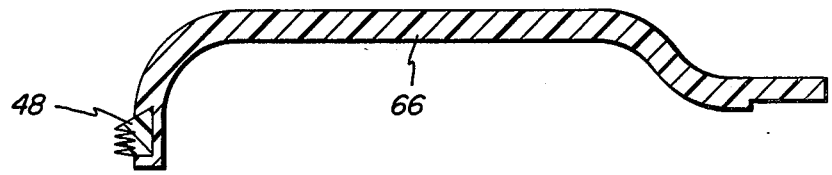

To give nozzle-shield assembly 46 strength adequate to resist vibrations and the pressure difference developed by fan 36 and at the same time to maintain uniform stiffness at each circumferential location of nozzle-shield assembly 46, arcuate sections 66 and 68 may be provided with a thickness which decreases circumferentially from a maximum value near the radial joints between sections 66 and 68 to a minimum value at a position 60–90 degrees away from the location of each joint as shown in FIGS. 6, 7, and 8, cross-sectional views of section 66 taken respectively along lines 6—6, 7—7, and 8—8 of FIG. 4. Tapering of the thickness of arcuate sections 66 and 68 inhibits any tendency for increased movement at the joints between sections during operation of dynamoelectric machine 20 at the expense of some additional fabrication cost over that associated with use of sections of a constant thickness equal to the minimum required near the joints. From a cost standpoint, the choice of either a tapered or constant thickness depends on the cost of material used in the arcuate sections and the additional labor required in fabricating sections of varying thickness. For example, a tapered thickness may be particularly cost effective if relatively costly high-strength carbon or boron fibers plus resin are employed rather than the less expensive fiberglass plus polyester resin currently regarded as preferred materials. Use of a tapered thickness also provides lighter sections for ease in handling, and results in more channel area for coolant gas flow, which may be desirable in certain machines.

Arcuate sections 66 and 68 may be fabricated by molding a single annular ring, then cutting the ring into two halves or by molding each section separately, the former method offering the potential that most of the post-molding machining to final dimensions can be performed prior to cutting but also presenting problems of molding and handling very large pieces. In either variation of the molding process, layers of fibrous material such as woven glass cloth or roving of desired thickness (e.g., 0.075–0.100 inch) are precut into segments of approximately trapezoidal shape, saturated with an adhesive such as one of several commercially available polyester resins, positioned around a suitable mold upon which segments of rub strip 48 have been pre-placed, then allowed to cure under vacuum. Vacuum treating the arcuate sections during cure, as by covering the mold and fiberglass/resin layup with a bag of plastic sheet and applying a vacuum, helps to produce a compact structure with a minimum number of internal voids. Following a post bake treatment, removal from the mold, and cutting into two sections if necessary, arcuate sections 66 and 68 are assembled, finish machined, and installed in dynamoelectric machine 20.

While there has been shown and described what is considered a preferred embodiment of the invention, it is understood that various other modifications may be made to the integral nozzle-shield assembly without departing from the essential nature and function of the invention, and it is intended by the appended claims to cover all such modifications as fall within the true spirit and scope of this invention.

What is claimed is:

1. In combination with a dynamoelectric machine having a stator including a stator core, a rotor disposed within said core and defining a gas gap with said core, a gas cooler, and a fan having a plurality of blades attached to said rotor for circulating coolant gas through said dynamoelectric machine, the improvement comprising an integral composite nozzle-shield assembly for guiding the flow of coolant gas between said cooler and said fan, said nozzle-shield assembly including:
  a pair of 180-degree arcuate sections of non-electrically conductive non-magnetic material;
  means for connecting the outer edge portion of each of said sections to said stator;
  means for interconnecting said 180-degree arcuate sections along radial joints;
  a rub strip within an annular recess in an inner edge portion of each of said arcuate sections and having a serrated surface, said serrated surface adapted to provide, when said arcuate sections are mounted in close proximity to said fan blades, a labyrinth seal to minimize leakage of coolant gas between said rub strip and said fan blades.

2. The combination according to claim 1 wherein said means for interconnecting said 180-degree sections comprises a flat metal plate and a plurality of bolts.

3. The combination according to claim 2 wherein the thickness of each of said 180-degree sections decreases from a maximum value near said radial joints, to a minimum value at a circumferential location between 60 and 90 degrees from said joints.

4. The combination according to claim 3 wherein said arcuate sections are fabricated from a resin plus a fibrous material selected from the group consisting of fiberglass, carbon fibers, and boron fibers.

5. The combination according to claim 4 wherein said rub strip is of trapezoidal cross section with first and second nonparallel sides adjacent to said serrated surface, said first nonparallel side oriented at an obtuse angle with respect to said serrated surface to facilitate permanent retention of said strip in said arcuate sections.

6. The combination according to claim 5 wherein said second nonparallel side of said rub strip includes dowels for permanently retaining said rub strip in said arcuate sections.

* * * * *